(12) United States Patent
Ananthakrishnan et al.

(10) Patent No.: US 9,185,180 B2
(45) Date of Patent: Nov. 10, 2015

(54) HYBRID CACHING SYSTEM

(75) Inventors: Hariharan Ananthakrishnan, Sunnyvale, CA (US); Srinivasan Santhanam, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 186 days.

(21) Appl. No.: 13/589,817

(22) Filed: Aug. 20, 2012

(65) Prior Publication Data

US 2014/0052911 A1  Feb. 20, 2014

(51) Int. Cl.
    *H04L 29/08* (2006.01)

(52) U.S. Cl.
    CPC ........ *H04L 67/2842* (2013.01); *H04L 67/1097* (2013.01); *H04L 67/2828* (2013.01)

(58) Field of Classification Search
    CPC ............................... H04L 67/28; G06F 12/08
    USPC ......................................................... 711/118
    See application file for complete search history.

(56) References Cited

U.S. PATENT DOCUMENTS

| 7,403,137 | B1 * | 7/2008 | Huang ............................ 341/51 |
| 2007/0234324 | A1 * | 10/2007 | Ananthakrishnan et al. . 717/151 |
| 2008/0320106 | A1 * | 12/2008 | McCanne et al. ............. 709/219 |
| 2010/0281051 | A1 * | 11/2010 | Sheffi et al. ................... 707/770 |
| 2012/0102148 | A1 * | 4/2012 | Arolovitch et al. ........... 709/217 |

* cited by examiner

*Primary Examiner* — Charles Rones
*Assistant Examiner* — Andrew Russell

(57) ABSTRACT

A system operable to: receive a request for an application unit from a first device; generating a key for the application unit; look up segment cache indices corresponding to the application unit, according to the key; and determine whether the segment cache indices are available. Where the segment cache indices are available, the system may retrieve a segment cache using the segment cache indices; and then retrieve the application unit using the retrieved segment cache. Otherwise, where the segment cache indices are not available, the system may communicate the request to a second device to receive a response from the second device including the segment indices. Further, the system may receive the response from the second device; store a segment index sequence for the application unit in an application optimizer cache based on the response; and retrieve the application unit via the segment index sequence.

16 Claims, 4 Drawing Sheets

Segment Cache Index

I1  I2  I3  I4  I5  I6  I7  I8  I9  I10

Segment Cache

| A1 | B1 | C1 |
| A2 | B2 | C2 |
| A3 | B3 | C3 |
|    | B4 |    |

Application Optimizer Cache

| <u>A</u> | <u>B</u> | <u>C</u> |
| I1 | I4 | I8 |
| I2 | I5 | I9 |
| I3 | I6 | I10 |
|    | I7 |    |

Figure 4

HYBRID CACHING SYSTEM

FIELD

The present disclosure relates to segment caching systems.

BACKGROUND

In a segment caching system, communication of redundant data may be reduced across a network (such as LAN/WAN) by using data redundancy reduction techniques. However, some data redundancy reduction techniques can be application unaware. For example, in one technique, nodes of a network may exchange indices of redundant data instead of the redundant data, because the redundant data may be already stored in a cache of a receiving node. Although this last mentioned technique reduces the amount of redundant data communicated over a network, such a technique may not reduce application requests/responses and respective indices that need to be communicated over a network.

BRIEF DESCRIPTION OF THE DRAWINGS

FIG. 4 illustrates an example segment cache, segment cache index, and application optimizer cache.

DESCRIPTION OF EXAMPLE EMBODIMENTS

Overview

Figure 1:
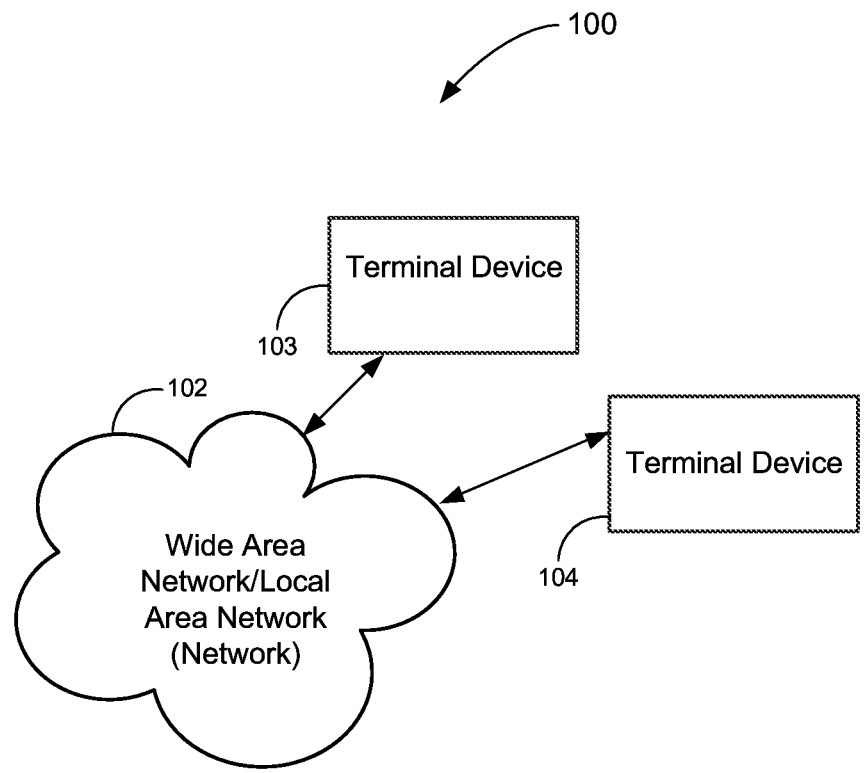
FIG. 1 illustrates a block diagram of an example network that can include an example terminal device that can implement an aspect of an example hybrid caching system.

In one embodiment, the hybrid caching system (HCS) facilitates a method for reducing redundant data while being application aware. The method may include receiving a request for an application unit from a requesting terminal device; generating a key for the application unit; and looking up segment cache indices corresponding to the application unit, according to the key. The method also may include determining whether the segment cache indices are available. For example, the determination may include determining whether all the segment cache indices are available for the application unit.

Where the segment cache indices are available, the method continues with retrieving a segment cache using the segment cache indices; and then with retrieving the application unit using the retrieved segment cache. In one embodiment, the retrieving of the application unit using the retrieved segment cache may occur via a segment index sequence.

Otherwise, where the segment cache indices are not available, the method continues with communicating the request to a peer terminal device to receive a response from the peer terminal device including the segment indices. In the case of the peer terminal device responding, the method continues with receiving the response from peer terminal device including the segment indices; storing a segment index sequence for the application unit in an application optimizer cache based on the response received from the peer terminal device; and retrieving the application unit via the segment index sequence. In either case, the retrieving application unit may be communicated to the requesting terminal device, directly or via the peer terminal device.

In another embodiment, the hybrid caching system (HCS) may include a system for reducing redundant data while being application aware. The system may include a control unit, a first electronic device, and a second electronic device, wherein the control unit may be a part of the first or the second electronic device. Also, the control unit, the first electronic device, and the second electronic device may be part of one electronic device. Alternatively, the control unit, the first electronic device, and the second electronic device may be separate network nodes (such as terminal nodes of a same network branch).

The first electronic device and the second electronic device each may include a respective segment cache, a respective segment cache index, and a respective application optimizer cache. Each of the respective application optimizer caches may include the respective segment cache index organized by applications. Further, respective segment cache indices of each of the respective segment cache indexes may be organized per application.

In the system, prior to a communication of an application unit from the first electronic device to the second electronic device, the control unit determines whether data of the application unit is available in the respective segment cache of the second electronic device. Where data of the application unit is available in the respective segment cache of the second electronic device, the control unit retrieves the application unit in the second electronic device based on the data of the application unit and the respective application optimizer cache of the second electronic device. Otherwise, the first electronic device communicates the data of the application unit to the second electronic device.

In one embodiment, a system for reducing redundant data while being application aware may include a processor, and a memory device that may include processor executable instructions that when executed by the processor may be operable to: receive a request for an application unit, from a terminal device; generate a key for the application unit; and query segment cache indices corresponding to the application unit, according to the key. Further, when executed the instructions may be operable to: determine whether the segment cache indices corresponding to the application unit are available; and then retrieve a segment cache using the segment cache indices, due to determining the segment cache indices are available. Otherwise, due to determining the segment cache indices are not available, the instructions may be operable to store a segment index sequence for the application unit in an application optimizer cache that may include the segment cache indices that may be sequence per application unit.

With respect to the application optimizer cache, this cache may include the segment cache indices and the segment index sequence for the application unit. Also, the segment cache indices of the application optimizer cache may be organized per application unit.

With respect to the application unit, it may be an application object, file, code block, or the like. Regarding the electronic devices, both the first electronic device and the second electronic device may be the same device. Alternatively, the second electronic device may be a peer terminal device, a peer optimizing device, a WAN side peer optimizing device, or the like.

Example Embodiments

Various embodiments described herein can be used alone or in combination with one another. The foregoing detailed description will describe only a few of the many possible implementations of the present embodiments. For this reason, this detailed description is intended by way of illustration, and not by way of limitation.

Communication of redundant data may be reduced across a network (such as LAN/WAN) by using data redundancy reduction techniques, such as communicating indices of redundant data. However, such data redundancy reduction techniques can be application unaware. For example, nodes of a network may exchange indices of redundant data instead of the redundant data, because the redundant data may already be stored in a cache of a receiving node. Although communicating indices of redundant data reduces the amount of redundant data communicated over a network, such a technique may not reduce application requests/responses and respective indices that need to be communicated over a network. Described herein is a system that may reduce such application requests/responses and respective indices communicated over a network (referred to as the hybrid caching system or HCS). Further, the HCS may reduce application requests/responses and respective indices within a single terminal device or network node.

For example, a segment caching system may segment data (such as data associated with an application object, block, or file) into multiple blocks or bytes and then the system may index such blocks or bytes. In other words, in a computer system using segmentation, a reference to a memory location may include a value that identifies a segment and an offset within that segment. One or more segments may be used in object files of compiled computer programs when they are linked together into a program image and when the image is loaded into memory. Different segments may derive different program modules, or be a source for different classes of memory usage such as code and data segments. Certain segments may even be shared between applications.

A segment caching system may be hosted by a network node, such as terminal device. The network node when communicating redundant data with other nodes, communicates indices of the redundant data instead of the redundant data, since the other nodes are likely to have already indexed the redundant data. This technique reduces the communication of redundant data such as redundant blocks or bytes, but does not reduce redundant application level data, such as application requests/responses and respective indices. Furthermore, redundant application level data can include other types of application administrative information, such as lookup information regarding which blocks or bytes stored in a segment cache are associated with a requested application or a requested application data unit. The HCS may reduce such redundant application level data. For example, the HCS generates application level indices. The application indices may be organized per application data unit (such as per application object, block or file, for example). This allows the system to become application aware, which can reduce the traffic of application related data. Further, the HCS may generate a cache (also referred to as the application optimizer cache), which may include organized indices with respect to application data units (such as application objects, byte blocks, or files).

For example, a segment cache for application A may include identified redundant blocks A1, A2, and A3, a segment cache index may include indices I1-I10, some of which identify redundant blocks A1, A2, and A3 (making the system unaware of which indices belong to which applications). However, in the case of a system including the application optimizer cache, a separate cache may be generated for each application, so that there is one cache for application A, which includes indexes I1, I2, and I3 representing redundant blocks A1, A2, and A3 (See FIG. 4, explained below). Since there is a separate cache for each application, the system becomes application aware. Furthermore, the application optimizer cache, which may be stored locally, may include a lookup table that makes the system application aware; therefore, locations of application data units within a segment cache are known without relying on communications with a remote device or storage unit including such information.

In one aspect of the HCS, each device or node running the HCS generates a segment cache, a segment cache index, and an application optimizer cache. Then when data is communicated from one device to another device or one component of a device to another component, via the application optimizer cache, the HCS may check if respective data blocks are available for an application data unit in the segment cache. Where blocks are available, the HCS may retrieve or may facilitate retrieving an application data unit. The application data unit then may be communicated from one device to another device or one component of a device to another component. In other words, although the HCS is in actuality a segment caching system, it becomes a functional equivalent of content caching system without using additional storage that would be required by a content caching system since it is transmitting indices indicative of redundant data content instead of the redundant data content itself.

FIG. 1 illustrates a block diagram of an example network 100 that can include a local area network (LAN)/wide area network (WAN) 102 and terminal devices, such as terminal devices 103 and 104. The terminal devices, such as the terminal devices 103 and 104 can, separately or in combination, implement an example HCS, for example. Although not depicted, the network 100 may also include other terminal devices, and mass storage and other LANs or WANs or any other form of area networks such as a metropolitan area network (MAN), a storage area network (SAN).

The network 100 may couple network nodes so that communications between such nodes can occur, whether communications are wire-line or wireless communications. Such communications occur via wire-line or wireless channels, and in communicating across such channels, the network 100 may utilize various architectures and protocols and may operate with a larger system of networks. Further, the various nodes of the network 100 may provide configurations for differing architectures and protocols. For example, a router may provide a link between otherwise separate and independent LANs, and a network switch may connect two or more nodes or groups of nodes. Signaling formats or protocols employed may include, for example, TCP/IP, UDP, or the like.

The network 100 may also include one or more computational node that includes the HCS or an aspect of the HCS. A computational node may be one or more of any electronic device that can perform computations, such as a general-purpose computer, a mainframe computer, a workstation, a desktop computer, a laptop computer, a mobile device, and so forth. Also, a computational node can include logic, such as application logic and logic of the HCS. As discussed below in detail, during operation of the HCS, computational nodes may run an application that is shared between the nodes without communicating application data units and application level data between the nodes. In a case where a node is application unaware due to not caching application level data, such a node can request the application level data from another node and store the application level data in an application optimizer cache, so that next time the node requests such data it can retrieve it locally.

Figure 2:
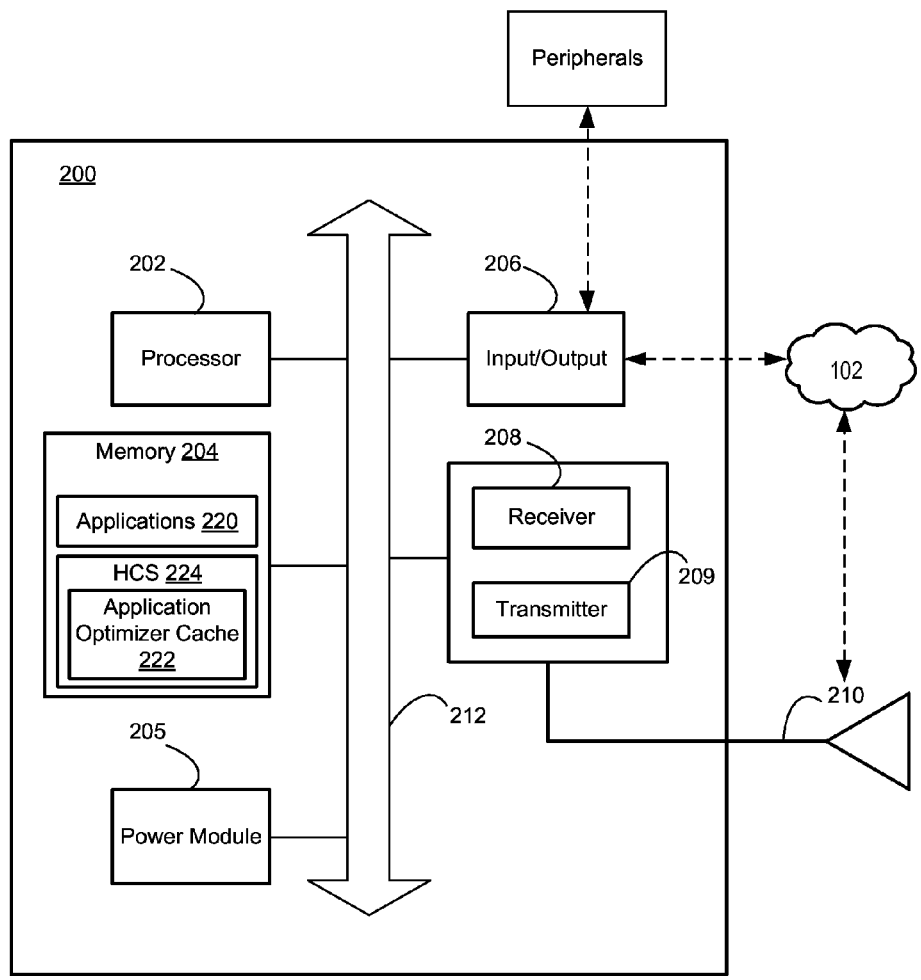
FIG. 2 illustrates a block diagram of an example terminal device that can implement an aspect of an example hybrid caching system.

FIG. 2 illustrates a block diagram of an example terminal device 200 that can implement an example HCS or an aspect of the HCS. Instances of the terminal device 200 can be the terminal device 103 or 104, or any other electronic device or set of electronic devices capable of at least storing and executing the HCS and communicating with other nodes of the network 100.

The terminal device 200, which can be a combination of multiple electronic devices, may include a processor 202, memory 204, a power module 205, input/output 206 (including input/out signals and internal, peripheral, user, and network interfaces), a receiver 208 and a transmitter 209 (or a transceiver), an antenna 210 for wireless communications, and a communication bus 212 that connects the aforementioned elements of the terminal device.

The processor 202 can be one or more of any type of processing device, such as a central processing unit (CPU). Also, for example, the processor 202 can be central processing logic; central processing logic includes hardware, firmware, software and/or combinations of each to perform a function(s) or an action(s), and/or to cause a function or action from another component. Also, based on a desired application or need, central processing logic may include a software controlled microprocessor, discrete logic such as an application specific integrated circuit (ASIC), a programmable/programmed logic device, memory device containing instructions, or the like, or combinational logic embodied in hardware. Also, logic may also be fully embodied as software.

The memory 204, such as RAM or ROM, can be enabled by one or more of any type of memory device, such as a primary (directly accessible by the CPU) and/or a secondary (indirectly accessible by the CPU) storage device (such as flash memory, magnetic disk, optical disk). Further, the memory 204 may include applications 220 and an example application optimizer cache 222, such as the application optimizer cache mentioned above. As depicted, the application optimizer cache 222 may be an aspect of an example HCS 224.

The power module 205 may contain one or more power components, and facilitates supply and management of power to the terminal device 200.

The term "module" may be defined to include a plurality of executable modules. As described herein, the modules are defined to include software, hardware or some combination thereof executable by a processor. Software modules may include instructions stored in memory that are executable by the processor. Hardware modules may include various devices, components, circuits, gates, circuit boards, and the like that are executable, directed, and/or controlled for performance by the processor. Furthermore, any aspect of the system or combination of aspects described herein may be a module.

The input/output 206, can include any interfaces for facilitating communication between any components of the terminal device 200, components of external devices (such as components of other devices of the network 100), and end users. For example, such interfaces can include a network card that may be an integration of the receiver 208, the transmitter 209, and one or more I/O interfaces. The network card, for example, can facilitate wired or wireless communication with other nodes of the network 100. In cases of wireless communication, the antenna 210 can facilitate such communication. Also, the I/O interfaces, can include user interfaces such as monitors, keyboards, touchscreens, microphones, and speakers. Further, some of the I/O interfaces and the bus 212 can facilitate communication between components of the terminal device 200, and in one embodiment ease processing performed by the processor 202.

Figure 3:
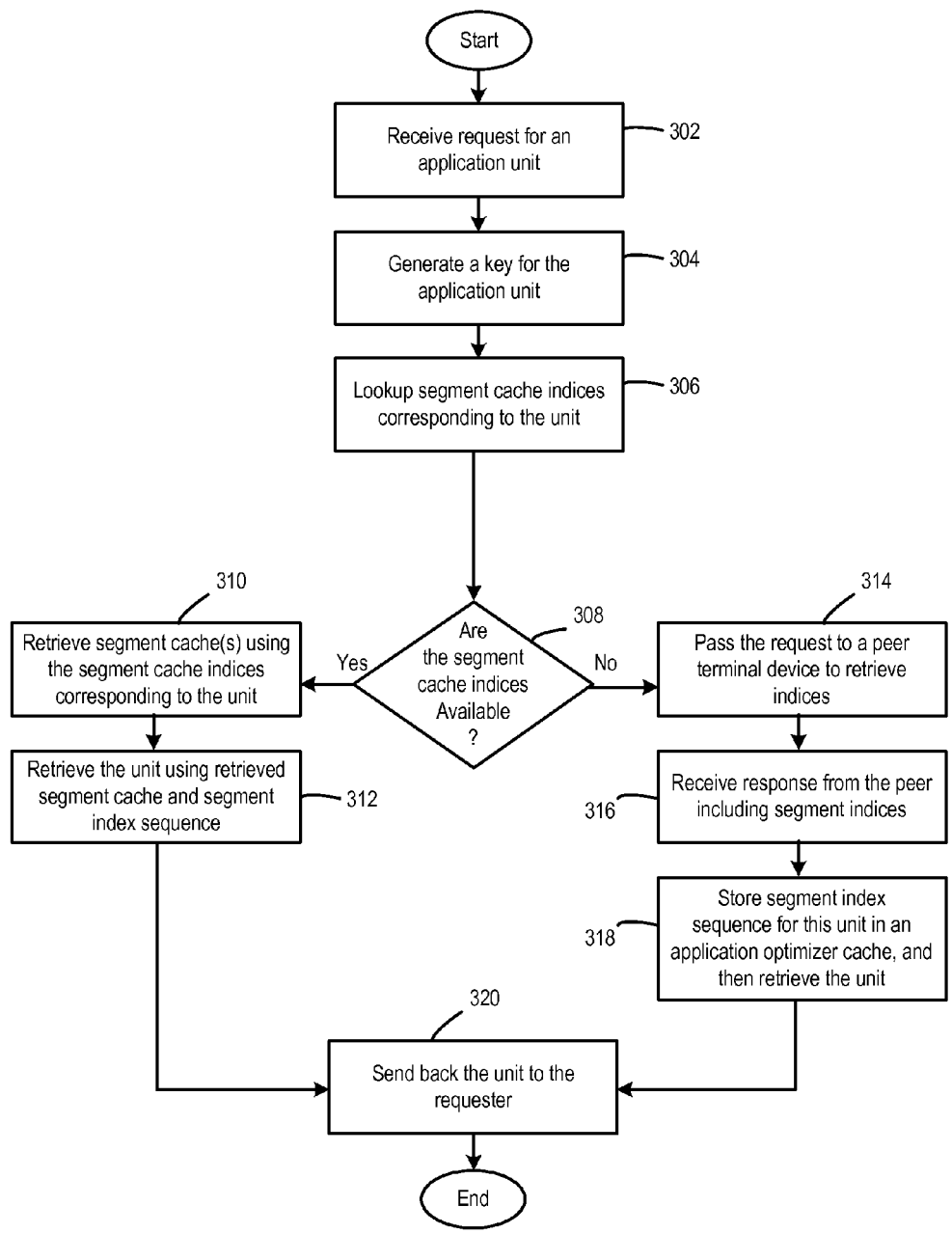
FIG. 3 illustrates a flow chart of an example method performed by the terminal device of FIG. 2.

FIG. 3 illustrates a flow chart of an example method 300 performed by a computational node of the network 100 and/or a terminal device, such as the terminal device depicted in FIG. 2. In one embodiment, the processor 202 performs the method 300 by executing processing device readable instructions encoded in the memory 204. Further, in one embodiment, the device readable instructions encoded in the memory 204 may include the HCS 224, the application optimizer cache 222, and application files. Further, the memory 204 may include byte blocks or objects of the applications 220.

The method 300 starts with a first HCS (such as HCS 224) receiving a request for an application unit (302) from a requester, such as a computer or another type of network node, such as the terminal device 200. Also, the requester may be a local module or a remote module. After receiving the request for the application unit, the first HCS may generate a key for the application unit (304), wherein the key is a unique identifier of the application unit. After generating a key for the application unit, the first HCS may look up segment cache indices corresponding to the application unit, according to the key (306). Alternatively, this lookup may occur prior or during the generation of the key for the application unit. Also, alternatively, the first HCS may look up segment cache indices via an application optimizer cache, without using a key.

After or during looking up the segment cache indices, the first HCS may determine whether the segment cache indices are available in a store, such as the memory 204 (308). In one embodiment, the first HCS may determine whether all the segment cache indices are available in the store. Where the segment cache indices are available in the store, the first HCS may retrieve one or more segment cache(s) using the segment cache indices corresponding to the application unit (310). Next, the first HCS may retrieve the application unit via a segment index sequence (such as one of segment index sequences for applications A, B, or C, depicted in FIG. 4), using the one or more retrieved segment cache(s) (312). In one embodiment, the one or more retrieved segment cache(s) may only include redundant aspects or data of the application unit, and a remainder of the application unit that is not redundant may be retrieved from another cache (whether the other cache is local or remote). After the retrieving of the application unit, the first HCS may send back the retrieved application unit to the requester (320).

Otherwise, where the segment cache indices corresponding to the application unit (or the request) are not available in the store, the first HCS may pass the request to a peer terminal device, such as a WAN side peer optimizing device or another type of peer optimizing device (314). Next, a second HCS in the peer terminal device may send back a response including any segment indices available in the store and/or stored in a segment cache of the peer terminal device (316). The first HCS, then at 318, may generate and store a segment index sequence for the application unit in an application optimizer cache, such as the application optimizer cache 222. After storing the segment index sequence for the application unit in the application optimizer cache, the first HCS may retrieve the application unit via the segment index sequence. After the retrieving of the application unit, the first HCS may send back the object to the requester (320).

FIG. 4 depicts an example segment cache, segment cache index, and application optimizer. As shown, the depicted segment cache index includes indices I1 through I10. The depicted segment cache includes code blocks (or application units) A1 through A3 associated with an application A, B1 through B4 associated with an application B, and C1 through C3 associated with an application C. The depicted application optimizer cache includes three segment index sequences for applications A, B, and C. The segment index sequences include segment cache indices sequenced per application unit. For example, the segment index sequences for application A includes indices I1 through I3 that correspond to application units indexed A1 through A3, respectively.

Various embodiments described herein can be used alone or in combination with one another. The foregoing detailed description has described only a few of the many possible implementations of the present embodiments. For this reason, this detailed description is intended by way of illustration, and not by way of limitation.

We claim:

1. A method for reducing redundant data comprising:
   receiving a request for an application unit of an application from a requesting terminal device;
   generating, by a processor, a key for the application unit, the key being a unique identifier for the application unit and associated with the application;
   looking up an application optimizer cache for segment cache indices corresponding to the application unit, according to the key, the application optimizer cache storing segment cache indices per application and sequenced per application unit for each application;
   determining whether the segment cache indices corresponding to the key are available;
   due to determining the segment cache indices corresponding to the key are available:
      retrieving a segment cache using the segment cache indices; and
      retrieving the application unit using the retrieved segment cache; and
   due to determining the segment cache indices are not available:
      communicating a request to a peer terminal device to elicit a response from the peer terminal device that includes the segment cache indices;
      receiving the response from the peer terminal device;
      generating and storing a segment index sequence for the application unit in the application optimizer cache based on the response received from the peer terminal device; and
      retrieving the application unit via the segment index sequence.

2. The method of claim 1, wherein the application unit is an application object.

3. The method of claim 1, wherein the application unit is an application file.

4. The method of claim 1, wherein the application unit is a code block.

5. The method of claim 1, wherein the determination of whether the segment cache indices are available includes determining whether all segment cache indices are available.

6. The method of claim 1, wherein the peer terminal device is a peer optimizing device.

7. The method of claim 1, wherein the peer terminal device is a WAN side peer optimizing device.

8. The method of claim 1, further comprising: communicating the application unit to the requesting terminal device.

9. A system for reducing redundant data comprising:
   a second electronic device in communication with a first electronic device; and
   respective caching circuitry of the second electronic device, wherein the first electronic device and the second electronic device each include a respective segment cache, a respective segment cache index, and a respective application optimizer cache,
   wherein each of the respective application optimizer caches includes the respective segment cache index organized by application and sequenced per application unit for each application,
   wherein prior to a communication of an application unit of an application from the first electronic device to the second electronic device, the respective caching circuitry of the second electronic device is configured to determine whether data of the application unit is available and complete in the respective segment cache of the second electronic device by:
   generating a key for the application unit, the key being a unique identifier for the application unit and associated with the application;
   looking up the respective application optimizer cache of the second electronic device using the key, and
   wherein if it is determined that data of the application unit is available and complete in the respective segment cache of the second electronic device based on the key, the respective caching circuitry of the second electronic device is configured to retrieve the application unit in the second electronic device based on the data associated with the application unit and the respective application optimizer cache of the second electronic device, otherwise the second electronic device is configured to receive data associated with the application unit communicated from the first electronic device via respective caching circuitry of the first electronic device.

10. The system of claim 9, wherein the application unit is an application object.

11. The system of claim 9, wherein the application unit is an application file.

12. The system of claim 9, wherein the application unit is a code block.

13. A system for reducing redundant data comprising:
   a processor, and a storage device including processor executable instructions that when executed by the processor are configured to:
   receive a request for an application unit of an application, from a terminal device;
   generate a key for the application unit, the key being a unique identifier for the application unit and associated with the application;
   look up an application optimizer cache to query segment cache indices corresponding to the application unit, according to the key, the application optimizer cache storing segment cache indices per application and sequenced per application unit for each application;
   determine whether all the segment cache indices corresponding to the key are available;
   retrieve a segment cache using the segment cache indices, in response to a determination that all the segment cache indices corresponding to the key are available; and
   receive a segment index sequence for the application unit from a peer device and store the segment index sequence for the application unit in the application optimizer cache, in response to a determination that not all the segment cache indices corresponding to the key are available.

14. The system of claim 13, wherein the application unit is an application object.

15. The system of claim 13, wherein the application unit is an application file.

16. The system of claim 13, wherein the application unit is a code block.

\* \* \* \* \*